Aug. 23, 1932.　　　L. E. LA BRIE　　　1,872,982

BRAKE OPERATING MEANS

Filed Nov. 16, 1927

INVENTOR
LUDGER E. La BRIE
BY
M. W. McConkey
ATTORNEY

Patented Aug. 23, 1932

1,872,982

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE OPERATING MEANS

Application filed November 16, 1927. Serial No. 233,546.

This invention relates to brakes and is illustrated as embodied in novel operating mechanism for a front wheel automobile brake.

An object of the invention is to provide an inexpensive and readily adjustable operating device for the cam shaft or equivalent applying means for the brake.

In one desirable arrangement the novel applying means includes an operating arm in the form of an integral stamping having sides mounted on the shaft, together with an adjusting part such as a threaded screw which is movable lengthwise between the sides of the arm at the lower end of the arm. Preferably, there is a pivoted thrust arm supported by the shaft between the sides of the operating arm and which has its free end engaging the adjusting part.

In one desirable arrangement the thrust arm is in the form of a stamping having a double portion at its upper end which is looped around the shaft and which is formed at its lower end with a double thickness thrust portion engaging the adjusting part. I prefer to form the operating arm with spaced sides at its lower end to embrace a nut in which the adjusting screw is threaded, and this may be conveniently done by making the arm as a single stamping with the spaced sides integrally connected by a portion extending across the space between them and against which the above described nut may rest.

In the arrangements illustrated in the drawing, the stamped operating arm has the spaced sides formed with aligned openings to be sleeved on the shaft and which sides are slotted at their upper ends so that they may be contracted into clamping engagement with the shaft by a bolt or the like held in place by the upper ends of the above described slotted sides. Preferably, the sides are bent toward each other to embrace the clamping bolt, as for example, being formed with notched ears bent toward each other to fit over the bolt.

The above and other objects and features of the invention, including various novel and desirable structural details, will be apparent from the following description of two illustrative embodiments shown in the accompanying drawing, in which.

Figures 1, 2:
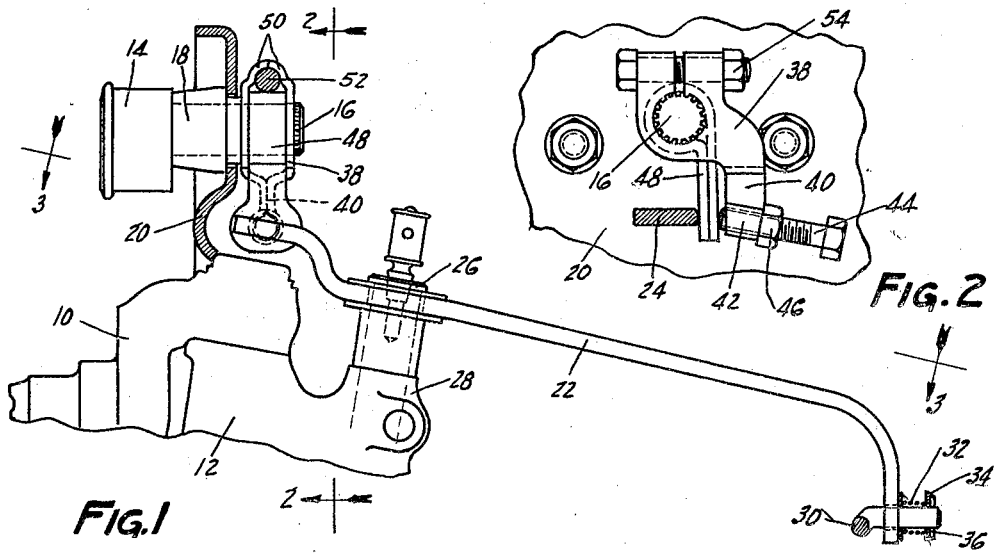
Figure 1 is a partial vertical section through enough of the brake and adjacent parts to show the operating mechanism.
Figure 2 is a partial vertical section through the operating mechanism on the line 2—2 of Figure 1.
Figure 3:
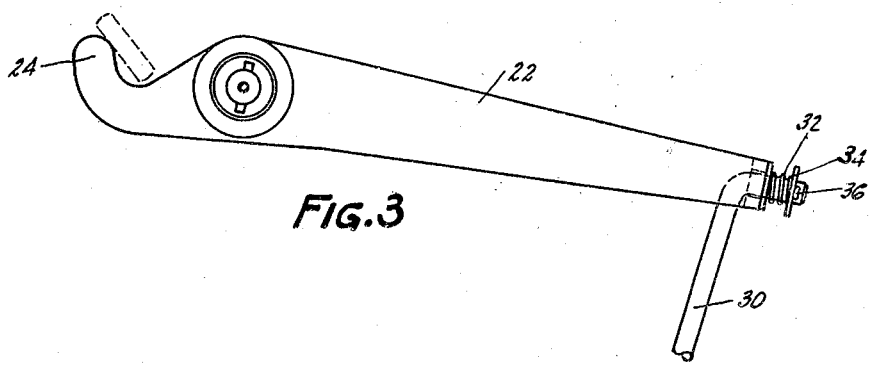
Figure 3 is a top plan view of the operating lever on the axle looking in the direction of the arrows 3—3 of Figure 1.

In the arrangement shown in the drawing, the brake proper is not illustrated, as it may include any suitable friction means mounted on a front wheel knuckle 10 swivelled by a king pin at one end of the front axle 12. The brake is operated by means such as a cam 14 carried by a cam shaft 16 journaled in a bearing 18 secured in any desired manner to a backing plate 20 carried by the knuckle 10. In the particular arrangement illustrated, the shaft 16 is rocked to apply the brakes by a novel adjustable arm which forms the subject matter of the present invention, and which is operated by a horizontal lever 22 having at its outer end a thrust portion 24 engaging the arm and which is fulcrumed on a pin 26 clamped in a boss 28 formed on the front axle 12. The lever 22 is operated to apply the brake by a suitable rod or other connection 30 bent at its end to extend through an opening in the arm 22. A spring 32 is confined between the lower end of the arm of the lever 22 and a washer 34 secured on the end of the rod 30 by means such as a cotter pin 36.

In the arrangement of Figures 1 and 2, the novel operating arm is formed as a steel stamping 38 formed in one integral piece to provide two spaced sides having serrated openings in alignment with each other to be sleeved on the serrated end of the shaft 16 and which are slotted at their upper sides as shown in Figure 2 so that they may be contracted upon the shaft. At their lower ends the sides of the stampings 38 are integrally connected, being brought together into a double thickness portion 40 which is formed with a loop or sleeve 42 at the bottom of the arm which is threaded to receive an adjusting screw 44. A lock nut 46 may be threaded on the adjusting screw 44, if desired, in engagement with the front face of the portion 42 of the lever or arm 38.

Preferably there is a thrust arm in the form of a second stamping 48 which is looped around at its upper end to be sleeved on the shaft 16 between the sides of the arm 38, and which is then continued downwardly as a double thickness thrust portion engaged by the part 24 of the lever 22 and transmitting the thrust of the lever to the adjusting screw 44 carried by the arm 38. If the thrust arm 48 is omitted, preferably the adjusting screw 44 is reversed so that its head is engaged by the end of lever 22. The upper parts of the two spaced sides of the arm 38 are bent toward each other at 50 to embrace a clamping bolt 52 having a nut 54 which can be tightened to contract the slotted sides of the arm firmly upon the shaft 16.

Figures 4, 5:
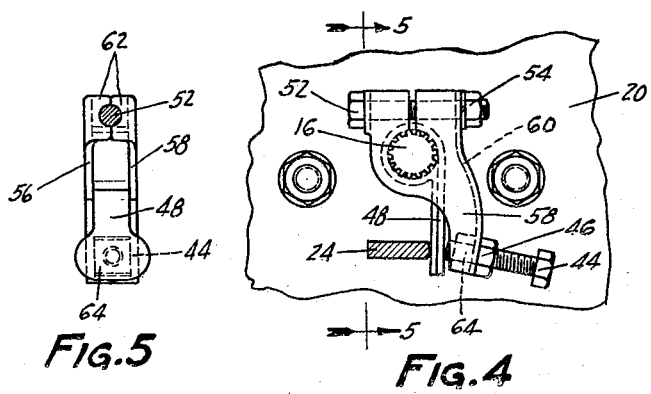
Figure 4 is a view corresponding to Figure 2, but showing a modified form of operating mechanism.
Figure 5 is a partial section on the line 5—5 of Figure 4 and showing the stamped arm in rear elevation.

In the arrangement of Figures 4 and 5, the spaced sides 56 and 58 of the novel brake applying arm, instead of being integrally connected only at the lower end of the arm as in Figures 1 and 2, are integrally connected at the front side of the arm by a portion 60,—that is, the arm is channel-shaped in horizontal section. The clamping bolt 52 in this case extends through the portion 60 at the front side of the arm and is engaged by notched ears 62 at the rear side of the arm, the ears 62 being bent toward each other to embrace the clamping bolt. The adjusting screw 44 in this case is threaded through a nut 64 embraced between the sides 56 and 58 of the arm and resting against the part 60 which integrally connects those sides.

While two illlustrative embodiments have been described in detail, it is not my intention to limit its scope to those particular embodiments or otherwise than by the terms of the appended claims.

I claim:

1. Brake-applying means comprising, in combination with a shaft, an operating arm including an integral stamping having spaced sides each embracing said shaft, and an adjusting part movable lengthwise between said sides at the end of the arm, together with a thrust arm supported by the shaft between said sides and having a part engaging said adjusting part.

2. Brake-applying means comprising, in combination with a shaft, an operating arm including an integral stamping having sides embracing said shaft, and an adjusting part movable lengthwise between said sides at the end of the arm, together with a pivoted thrust arm having at its free end a part engaging said adjusting part.

3. Brake-applying means comprising, in combination with a shaft, an operating arm including an integral stamping having sides embracing said shaft, and an adjusting part movable lengthwise between said sides at the end of the arm, together with a second stamping having at one end a doubled portion looped around the shaft and being formed at its other end with a double-thickness thrust portion engaging said adjusting part.

4. Brake-applying means comprising, in combination with a shaft, an operating arm having spaced portions mounted on the shaft and having an adjusting part at its end, together with a second stamping having at one end a doubled portion looped around the shaft and being formed at its other end with a double-thickness thrust portion engaging said adjusting part.

5. Brake-applying means comprising, in combination, an operating arm having, at least at its end, spaced sides and a portion extending across the space between said sides, a nut resting against said portion and embraced between said sides, and an adjusting screw threaded in said nut.

6. A one-piece stamped operating arm formed with spaced sides having alined openings to be sleeved on a shaft, and with a portion integrally connecting said sides, together with an adjusting device embraced between said sides and resting against the connecting portion.

7. A one-piece stamped operating arm formed with spaced sides having alined openings to be sleeved on a shaft, and with a portion integrally connecting said sides, together with an adjusting device embraced between said sides.

8. A one-piece stamped operating arm formed with spaced sides having alined openings to be sleeved on a shaft, and with a portion integrally connecting said sides, said sides being slotted radially from said openings and being shaped to conform with a device for contracting the slotted portions of said sides upon a shaft in said openings.

9. A one-piece stamped operating arm formed with spaced sides having alined openings to be sleeved on a shaft, and with a portion integrally connecting said sides, said sides being slotted radially from said openings and having notched ears bent toward each other to embrace a bolt for contracting the slotted sides.

In testimony whereof, I have hereunto signed my name.

LUDGER E. LA BRIE.

CERTIFICATE OF CORRECTION.

Patent No. 1,872,982.  August 23, 1932.

LUDGER E. LA BRIE.

It is hereby certified that error appears in the printed specification of the above numbered patent requiring correction as follows: Page 2, line 53, claim 1, strike out the words "spaced" and "each"; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.